United States Patent
De Wit et al.

(10) Patent No.: US 9,574,614 B2
(45) Date of Patent: Feb. 21, 2017

(54) DRIVE COUPLING FOR HIGH-SPEED ROTATING BRUSH

(75) Inventors: Bastiaan Johannes De Wit, Nuis (NL); Wiebe Wierda, Drachten (NL); Fokke Roelof Voorhorst, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 415 days.

(21) Appl. No.: 14/236,251

(22) PCT Filed: Jul. 27, 2012

(86) PCT No.: PCT/IB2012/053849
§ 371 (c)(1),
(2), (4) Date: Jan. 30, 2014

(87) PCT Pub. No.: WO2013/021306
PCT Pub. Date: Feb. 14, 2013

(65) Prior Publication Data
US 2014/0150191 A1 Jun. 5, 2014

Related U.S. Application Data

(60) Provisional application No. 61/522,265, filed on Aug. 11, 2011.

(30) Foreign Application Priority Data

Aug. 11, 2011 (EP) ..................... 11177194

(51) Int. Cl.
*F16D 1/108* (2006.01)
*A47L 11/40* (2006.01)
*F16D 1/10* (2006.01)

(52) U.S. Cl.
CPC ............ *F16D 1/108* (2013.01); *A47L 11/4069* (2013.01); *F16D 1/10* (2013.01); *F16D 1/101* (2013.01);
(Continued)

(58) Field of Classification Search
None
See application file for complete search history.

(56) References Cited

U.S. PATENT DOCUMENTS 2,634,991 A 4/1953 Stevens
4,006,993 A 2/1977 Woerlee
(Continued)

FOREIGN PATENT DOCUMENTS

DE 102007053351 A1 5/2009
EP 1820987 A2 8/2007
(Continued)

*Primary Examiner* — Joseph J Hail
*Assistant Examiner* — Brian Keller (57) ABSTRACT

Drive coupling assembly (50) for a high-speed rotating brush, comprising:—a coupling head (100) having a coupling head rotation axis ($L_{ch}$) and including three drive surfaces (106) which are arranged to be rotationally symmetrical through 120° with respect to said coupling head rotation axis; and—a coupling member (200), having a coupling member rotation axis ($L_{cm}$) and including three first drive surfaces (210a) which are arranged to be rotationally symmetrical through 120° with respect to said coupling member rotation axis, wherein said coupling head (100) and said coupling member (200) are detachably couplable, such that, in a coupled condition, their rotational axes ($L_{ch}$, $L_{cm}$) are aligned and the coupling head is rotatable to drive each of its drive surfaces (106) in contact with a respective first drive surface (210a) of the coupling member, to thereby exert both a torque and an axially directed force on the coupling member.

12 Claims, 4 Drawing Sheets

(52) U.S. Cl.
CPC .... *F16D 2001/102* (2013.01); *Y10T 403/7039* (2015.01)

(56) References Cited

U.S. PATENT DOCUMENTS

| | | | | |
|---|---|---|---|---|
| 4,150,590 A | * | 4/1979 | Hurst | F16H 3/60 192/21 |
| 5,048,998 A | | 9/1991 | Viets et al. | |
| 5,165,140 A | * | 11/1992 | Ide | A47L 5/30 15/391 |
| 6,768,890 B2 | * | 7/2004 | Cho | F16D 1/101 399/120 |
| 2006/0185813 A1 | | 8/2006 | Chaterjee et al. | |
| 2006/0240896 A1 | | 10/2006 | Ohashi et al. | |
| 2008/0025788 A1 | * | 1/2008 | Dace | F16D 1/116 403/1 |
| 2009/0010681 A1 | | 1/2009 | Huck et al. | |

FOREIGN PATENT DOCUMENTS

| | | | |
|---|---|---|---|
| WO | 03011537 A1 | 2/2003 | |
| WO | 2009000041 A1 | 12/2008 | |

\* cited by examiner

DRIVE COUPLING FOR HIGH-SPEED ROTATING BRUSH

CROSS-REFERENCE TO PRIOR APPLICATIONS

This application is the U.S. National Phase application under 35 U.S.C. §371 of International Application No. PCT/IB2012/053849, filed on Jul. 27, 2012, which claims the benefit of U.S. Provisional Patent Application No. 61/522,265, Aug. 11, 2011 and European Patent Application No. 11177194.5, filed on Aug. 11, 2011. These applications are hereby incorporated by reference herein.

FIELD OF THE INVENTION

The present invention relates to the field of hard floor cleaning devices, and more in particular to a drive coupling for a high-speed rotating brush of such a cleaning device.

BACKGROUND

A hard floor cleaning device may include one or more high-speed rotating brushes. Each brush may have an elongate cylindrical core, extending axially between a first end and a second end, whose outer surface is covered with a brush material, e.g. soft microfiber filaments. The first and second ends of the brush may be bearingly mounted in the cleaning device so as to enable rotation of the brush around its axis, in particular when the latter is oriented parallel to and in abutment with a floor to be cleaned. The brush may typically be rotationally driven from one of its bearingly mounted ends, for which purpose the respective end may be detachably coupled to a transmission of an (electro)motor by means of a drive coupling assembly. The manner in which a brush is bearingly mounted in the hard floor cleaning device and coupled to the transmission may significantly effect its operating behavior.

For instance, it is known to mount a low-speed rotating brush, configured to be driven at a rotational speed of about 1,500 rpm, in a hard floor cleaning device by means of a drive coupling that includes an axial spring mechanism. The axial spring mechanism serves to take up axial play between the ends of the brush and brush mounting points of the cleaning device and to fix the brush's axial position between these mounting points (i.e. prevent travel of the brush through its range of axial play). This approach, however, does not appear suitable for mounting high-speed rotating brushes, which may be driven at rotational speeds of at least 2,500 rpm, e.g. at about 7,000 rpm. At such rotational speeds, slight imbalances in the mount of the brush may cause undesirably high levels of audible and sensible vibrations. To suppress these vibrations the clasping force exerted on the brush by the axial spring mechanism may be increased so as to stiffen the construction, but this also increases the risk of creep during the multiple-year life span of the device, and hence to further imbalances.

SUMMARY OF THE INVENTION

It is an object of the present invention to overcome or mitigate one or more of the above-mentioned problems associated with the known brush mount, in particular by providing a drive coupling that generates a sufficient clasping force and eliminates axial play only when the brush is being rotated.

A first aspect of the present invention is therefore directed to a drive coupling assembly for a high-speed rotating brush. The drive coupling assembly comprises a coupling head having a coupling head rotation axis and including three drive surfaces which are arranged to be rotationally symmetrical through 120 degrees with respect to said coupling head rotation axis. The drive coupling assembly further comprises a coupling member, having a coupling member rotation axis and including three first drive surfaces which are arranged to be rotationally symmetrical through 120 degrees with respect to said coupling member rotation axis. The coupling head and the coupling member are detachably couplable, such that, in a coupled condition, their rotation axes are substantially aligned and the coupling head is rotatable around the aligned axes to drive each of its drive surfaces in contact with a respective first drive surface of the coupling member. Furthermore, the drive surfaces of the coupling head and the first drive surfaces of the coupling member are configured such that driving the former in contact with the latter results in the exertion of both a torque and an axially directed force on the coupling member.

In the presently disclosed drive coupling assembly, a force at a contact or interface point between a coupling head's drive surface and a coupling member's first drive surface is generated only when one of the parts of the drive coupling is driven to transfer a torque onto the other. Hence, when the drive coupling is at rest, no forces, and in particular no axial forces, are generated, which prevents long term creep effects and the development of imbalances in the drive coupling. This effect is accomplished by a suitable configuration of the drive surfaces of the coupling head and the first drive surfaces of the coupling member, which are configured for mutual pairwise cooperation. If these drive surfaces are assumed to be generally smooth and continuous, and contact between each pair of them is additionally assumed to occur at a single contact point, the laws governing the surface contact prescribe that at the point of contact both a common normal and a common tangent exist, and that (in the absence of friction between the smooth surfaces) forces are transferred only along the common normal. Consequently, the first drive surfaces of the coupling member may, for example, be shaped such that each point of said surfaces is associated with a surface normal having both a non-zero component in the axial direction and a non-zero component in the tangential direction (both with respect to the coupling member's rotation axis), thus allowing the surface to sustain both an axially directed force along, and a torque around the coupling member rotation axis. Alternatively, or in addition, the same may mutatis mutandis apply to the drive surfaces of the coupling head. When a thus configured drive coupling is inserted between a transmission and a rotatably mounted brush, both of which may be fixedly attached to a respective part of the drive coupling, driving the brush via the drive coupling will provide an axial clasping force on the brush, which clasping force will squeeze axial play out of the system.

According to an elaboration of the invention, the drive surfaces of the coupling head and the first drive surfaces of the coupling member are configured such that driving the former in contact with the latter results in the exertion of a radially centering force on the coupling head.

A radially centering force provides additional stability to a drive coupling assembly that rotates at high rotational speeds, and may be sustained by drive surfaces with a surface normal having a non-zero component in the radial direction. The first drive surfaces of the coupling member may, for example, be shaped such that each point of said surfaces is associated with a surface normal having a non-zero component radial direction with respect to the coupling head rotation axis. Alternatively, or in addition, the same may mutatis mutandis apply to the drive surfaces of the coupling head.

One skilled in the art will appreciate that drive surfaces capable of sustaining tangential, axial and/or radial forces may be planar or curved, wherein a curved drive surface may have a constant or varying curvature. One drive surface configuration, however, appears particularly advantageous.

In a preferred embodiment of the drive coupling assembly, the first drive surfaces of the coupling member may be substantially identical helical sweep surfaces, which may be formed by transforming a straight line by helical motion, i.e. simultaneously rotating and moving the line around respectively along the coupling member's rotation axis. The helicoid thus formed is a ruled surface for every point of which there is a helix centered on the coupling member's rotation axis that is contained in said surface and passes through said point. Assuming that friction forces are ignored, a force generated at the interface between a coupling head's drive surface and a coupling member's drive surface acts along the normal of this latter surface. As the normal to the helicoidal drive surface includes a non-zero axial component, rotational driving contact between a coupling head's drive surface and a coupling member's helicoidal first drive surface may generate a force that tends to axially force the coupling head and the coupling member apart. The drive coupling may thus take up axial play. A notable advantage of helicoidal drive surfaces in this respect is that the contact forces at the interfaces between the coupling head and the coupling member are independent of the relative axial positions of the coupling head and the coupling member, and thus independent of the amount of axial play that the drive coupling has to accommodate.

In another embodiment of the drive coupling, the coupling member may further include three second drive surfaces, each of which second drive surfaces is mirror symmetric to a respective first drive surface, in a respective axial-radial plane of symmetry.

The coupling member may thus include six drive surfaces, dividable in three mirror symmetric pairs, each pair including a first and a second drive surface. Both the first drive surfaces and the second drive surfaces may be arranged to be rotationally symmetrical through 120 degrees with respect to the rotation axis of the coupling member. Due to this combination of rotational and mirror symmetry in the configuration of the coupling member's drive surfaces, the coupling member may be arbitrarily driven clockwise and anti-clockwise to generate the same axial and centering forces. From a practical point of view, this makes oppositely rotating brushes fitted with mutually identical coupling members interchangeable, so as to facilitate their replacement and prevent the need for separately manufactured clockwise and anti-clockwise drivable coupling members.

A second aspect of the present invention is directed to a high-speed rotating brush assembly for a hard floor cleaning device. The brush assembly comprises an elongate, substantially cylindrical brush that extends between a first end and a second end, and that is configured to be rotatably mounted at said ends in a floor cleaning device. One of said brush ends is provided with either a coupling head or a coupling member of a drive coupling assembly according to the first aspect of the present invention.

A third aspect of the present invention is directed to a floor cleaning device. The device comprises an elongate, substantially cylindrical brush that is rotatably mounted around its longitudinal axis, and a motor mechanism configured to drive the brush into rotation at a rotational speed of at least 2500 rpm. The device also comprises a drive coupling assembly according to the first aspect of the invention, disposed in between the motor mechanism and the brush, such that, during operation, a torque generated by the motor mechanism is transferred onto said brush via said drive coupling assembly, together with a force directed along the longitudinal axis of the brush.

These and other features and advantages of the invention will be more fully understood from the following detailed description of certain embodiments of the invention, taken together with the accompanying drawings, which are meant to illustrate and not to limit the invention.

DETAILED DESCRIPTION

Figure 1:
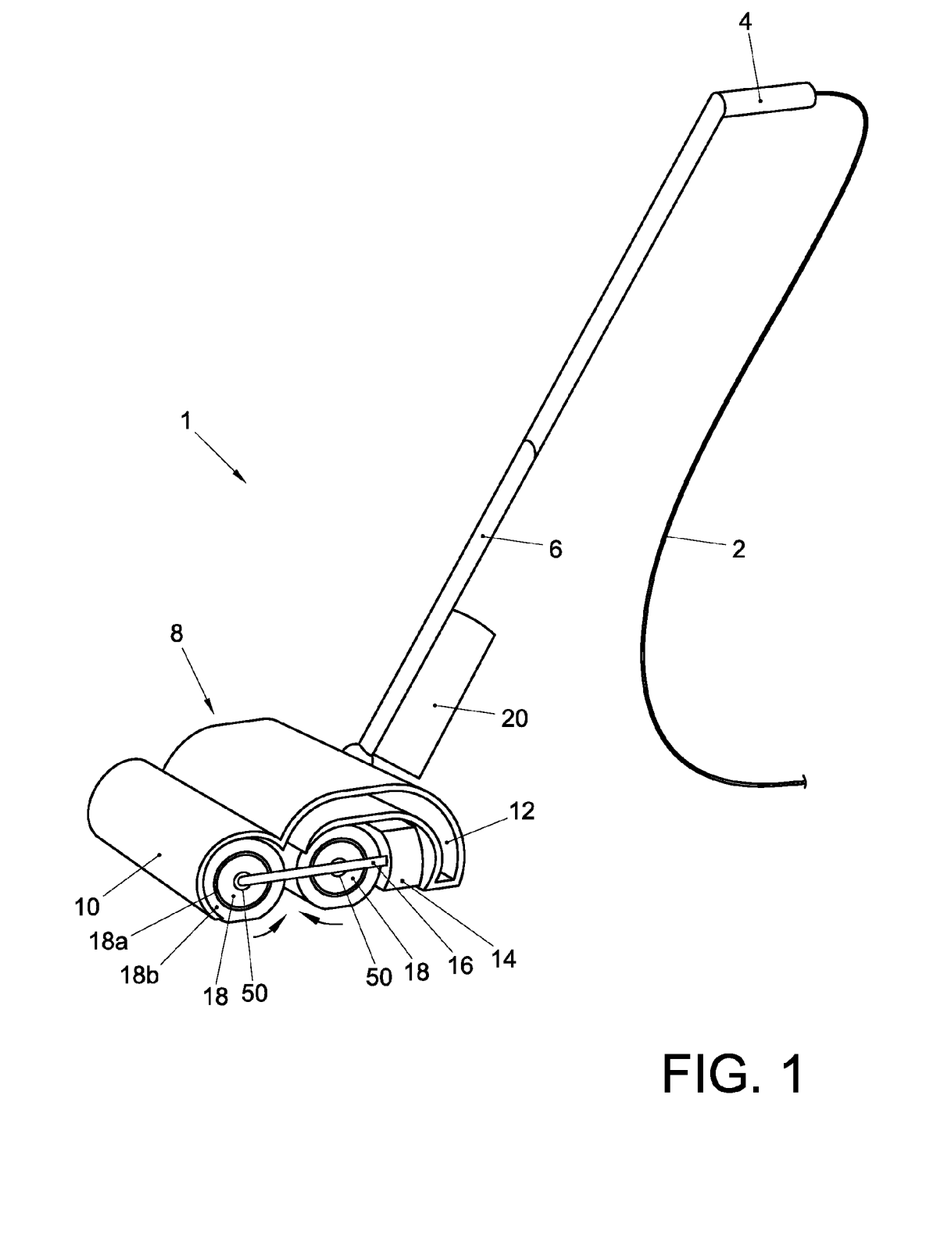
FIG. 1 schematically shows a perspective view of an exemplary floor cleaning device including two oppositely rotating high-speed brushes, and two drive coupling assemblies according to the present invention, one for each of said brushes.

FIG. 1 is a perspective view of an exemplary hard floor cleaning device 1 according to the present invention. The device 1 may include a handle 4, which may be connected to a housing 8 via a connection rod 6. The housing 8 may accommodate two high-speed rotating brushes 18. Each brush 18 may include an elongate, substantially cylinder jacket-shaped core 18a whose outer surface is covered with a brush material 18b, e.g. soft microfiber filaments. At its axial ends, each brush 18 may be rotatably mounted in the housing 8 around its longitudinal axis. The housing 8 may further accommodate a motor mechanism 14, 16 that is configured to drive each of the brushes 18 into rotation at a rotational speed of at least 2,500 rpm. The motor mechanism may include an electromotor 14 for generating a driving force/torque, and a transmission 16 for transferring the driving force/torque to the brushes 18, each time via a drive coupling 50 that is disposed between a respective brush 18 and the transmission 16. A power cord 2 may be connected to the handle 4 of the device 1 for supplying electrical power from the mains in order to enable operation of the drive mechanism 14, 16. The housing 8 may also include a splashboard 10 that roofs the brushes 18 from the floor up, and that defines a dirt trap or reservoir 12 in which dirt may be accumulated during use, as will be clarified below. Cleaning solution may be supplied to one or both brushes 18 (e.g. by injection into a core 18a of a brush 18 in case this core is water permeable so as to allow centrifugal forces to drive the water back out from the rotating core into the soft brush material 18b provided on the outside thereof) from a cleaning solution reservoir 20 that is attached to the connection rod 6. In use, the brushes 18 preferably rotate in opposite directions. In the view of FIG. 1 this amounts to a anti-clockwise and a clockwise rotation for the left and right brushes, respectively, as indicated by the bent arrows. The brushes 18, one or both of which may be wetted from the inside out as just described, may scrub the floor surface on which they rest. In addition, they may effect an upwardly directed air flow between them carrying dirt particles scrubbed off the floor. The splashboard 10 may deflect the air flow towards the dirt trap 12, in which the dirt particles may be deposited.

Figure 2:
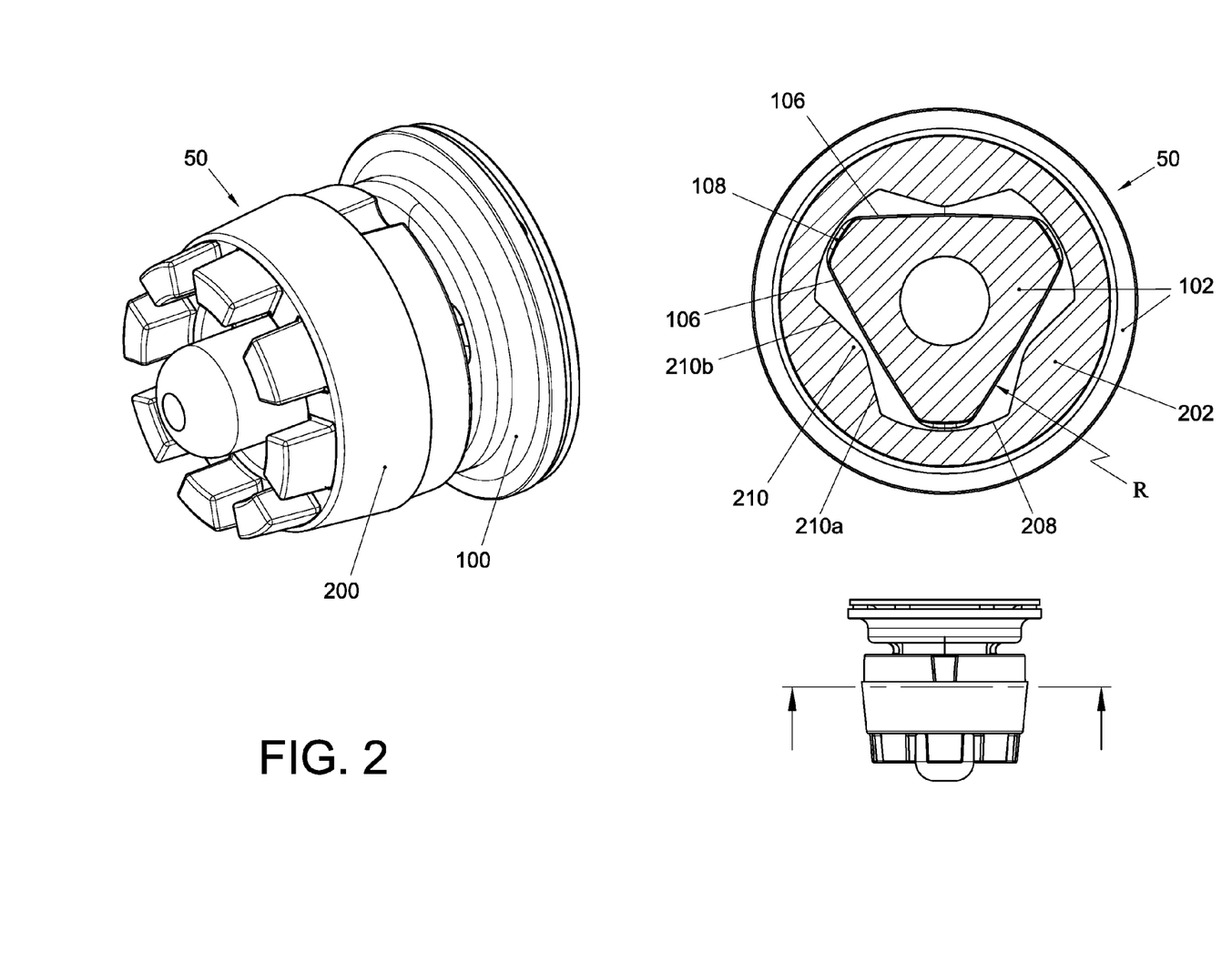
FIG. 2 schematically shows a perspective view (left) and a cross-sectional top view (right) of an exemplary drive coupling assembly according to the present invention, including a coupling head and a coupling member in a coupled condition.

FIG. 2 schematically shows a perspective view (left) and a cross-sectional top view (right) of an exemplary drive coupling assembly 50 according to the present invention, including a coupling head 100 and a coupling member 200 in a coupled condition. The coupling head 100 is schematically shown in more detail in the perspective (left) and top (right) views of FIG. 3, while the coupling member 200 is shown in more detail in the perspective (left) and top (right) views of FIG. 4. The construction of the coupling head 100 and the coupling member 200 is elucidated in turn below.

Figure 3:
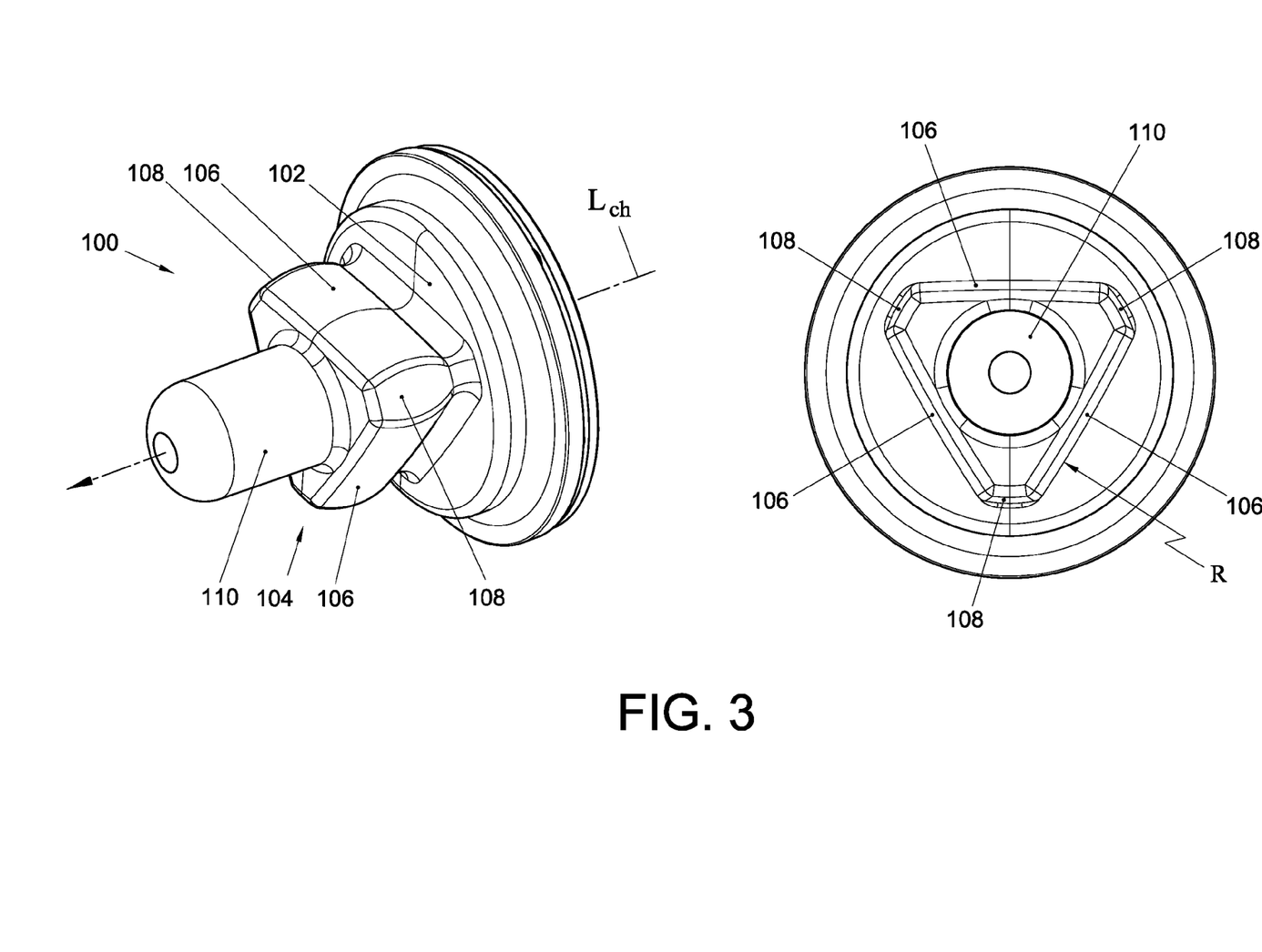
FIG. 3 schematically shows a perspective view (left) and a top view (right) of the coupling head of the drive coupling shown in FIG. 2.

Referring first to in particular FIG. 3. The coupling head 100 may include a coupling head body 102 having a central coupling head rotation axis $L_{ch}$. The coupling head body 102 may define a generally triangular drive section 104 that is rotationally symmetrical through 120 degrees around the rotation axis $L_{ch}$. The drive section 104 may provide for three drive surfaces 106 which, seen in the tangential direction, may be interconnected by connecting surfaces 108.

Each of the drive surfaces 106 of the coupling head 100 may, seen in a plane perpendicular to the axis of rotation $L_{ch}$, have a slight convex curvature (best visible in FIG. 2 (right) and FIG. 3 (right)) with a large radius of curvature R. The slight convex curvature ensures that, when a drive surface 106 is brought into contact with a right open helicoidal drive surface 210a, 210b of a coupling member 200 to be described below, there is only a single contact point between them, which point does not lie on an edge between the coupling head's respective drive surface 106 and adjacent connecting surface 108. This latter aspect reduces the risk of wear. To the same end, seen in a plane substantially transverse to a respective drive surface 106 and containing the coupling head rotation axis $L_{ch}$, each drive surface may also possess a convex curvature whose center of lies substantially on the coupling head rotation axis $L_{ch}$.

The body 102 of the coupling head 100 may further define a central (i.e. centered on the rotation axis $L_{ch}$ of the coupling head) substantially cylindrical, spherically-capped nose 110. In the depicted embodiment, the nose 110 is hollow and serves to fixedly accommodate a drive shaft, which drive shaft emerges from the transmission 16 (FIG. 1) and extends axially into the coupling head 100 in order to provide a torque to it. The nose 110 may preferably be dimensioned such that it fits inside a central cavity 204 of the coupling member 200 (see FIG. 4), allowing it so serve as an alignment tool to aid in radially aligning the coupling head 100 and the coupling member 200 during a first stage of assembly of the drive coupling 50 into its coupled condition. The nose 110 may additionally cooperate with a central opening 214 or recess in the back wall 212 of the coupling member 200 to help manoeuvre the coupling head 100 and the coupling member 200 into a position in which their rotational axes $L_{ch}$, $L_{cm}$ coincide during a further stage of assembly of the drive coupling 50 into its coupled condition.

Figure 4:
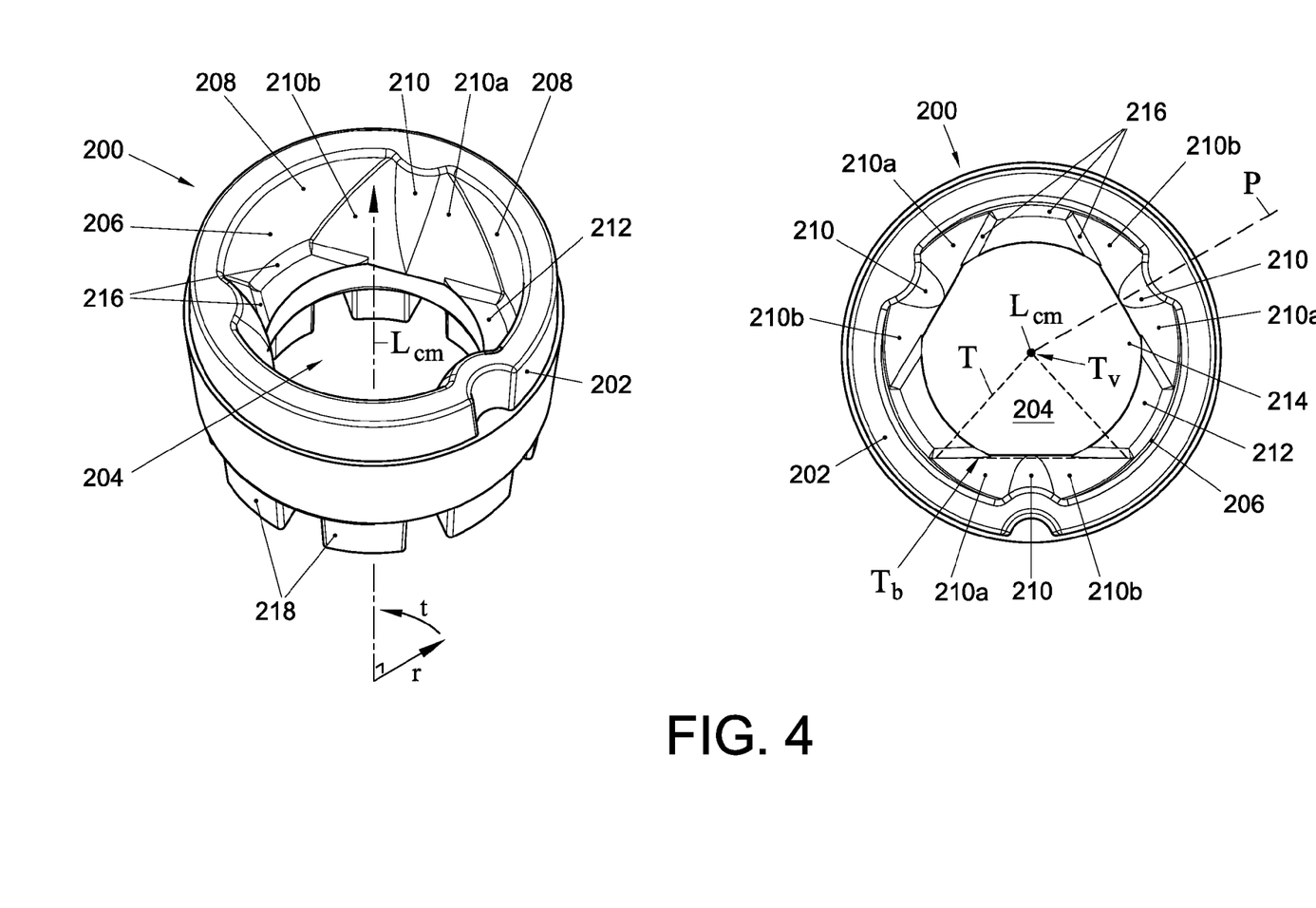
FIG. 4 schematically shows a perspective view (left) and a top view (right) of the coupling member of the drive coupling shown in FIG. 2.

Referring now in particular to FIG. 4. The coupling member 200 may include a coupling member body 202 having a central coupling member rotation axis $L_{cm}$. A front side portion of the coupling member body 202 may define a coupling head reception cavity 204 configured to at least partly receive the coupling head 100, and more particularly the generally triangular drive section 104 thereof. The cavity 204 may be defined as the space within or enclosed by a generally cylindrical side wall 206 of the body 202 that extends around the axis $L_{cm}$. A generally planar back wall 212 that extends perpendicular to the axis $L_{cm}$ and connects to the side wall 206 at the back of the cavity 204 may provide for a bottom thereof.

To enable an intelligible description of the construction of the coupling member 200, the rotation axis $L_{cm}$ is associated with a positive direction that points away from the back wall 212 of the cavity 204 and towards the front opening or entrance thereof. In addition, the central rotation axis $L_{cm}$ is taken as the reference axis of a right-handed cylindrical coordinate system, whose reference plane is co-planar with the back wall 212 of the cavity 204. The coupling member 200 will be illustrated in more detail with the cylindrical coordinate system thus defined.

Seen along the positive tangential direction t, the side wall 206 of the cavity 204 may alternatingly define generally cylindrical side wall sections 208 and inwardly protruding drive cams 210, such that three of each are provided along the inner circumference of the side wall. The three identical, inwardly protruding drive cams 210 may be arranged to be rotationally symmetrical through 120 degrees with respect to the axis $L_{cm}$. Again seen in the positive tangential direction t, each drive cam 210 may define a leading first drive surface 210a and a trailing second drive surface 210b, such that the first and second drive surfaces 210a, 210b of a single drive cam 210 are mirror symmetric to each other with respect to an axial-radial plane P that extends through the respective drive cam 210. Each of the first and second drive surfaces 210a, 210b may define a helicoid, more particularly a right open helicoid, whose axis substantially coincides with the axis $L_{cm}$.

The nature of the first and second drive surfaces 210a, 210b may be best understood from their mathematical construction, which to this end is briefly elucidated here. In general, a helicoidal drive surface 210a, 210b may be generated by screwing a straight line around an axis. The thus generated helicoid is called 'right' when the axis and the straight line are orthogonal; otherwise it is called 'skew'. Furthermore, the helicoid is called 'closed' when the axis and the straight line intersect; otherwise it is called 'open'. The right open helicoidal drive surfaces 210a, 210b in the depicted embodiment of the drive coupling 50 may be swept out by screwing an isosceles triangle T around the rotation axis $L_{cm}$. The triangle T may initially be coplanar with the back wall 212. It may have a vertex $T_v$ in which two sides of equal length meet that is confined to (motion on) the rotation axis $L_{cm}$. A base $T_b$ of the triangle T, disposed opposite to said vertex $T_v$, may—seen in a direction along the rotation axis $L_{cm}$—form a chord of the circle defined by the curve of intersection of the planar back surface 212 and the generally cylindrical side wall 206 of the cavity 204, around the rotation axis $L_{cm}$. When the triangle T is simultaneously translated along and rotated about the rotation axis $L_{cm}$, in a constant sense and at a constant axial velocity, respectively, the base $T_b$ of the triangle T sweeps out a helicoid. A leading first drive surface 210a may be swept out by the base $T_b$ of the triangle T when it is rotated in the positive tangential (in FIG. 3 anti-clockwise) direction and translated in the positive axial direction. Similarly, a trailing second drive surface 210b may be swept out by the base $T_b$ of the triangle T when it is rotated in the negative tangential (in FIG. 3 clockwise) direction and translated in the positive axial direction. Although the depicted embodiment of the coupling member 200 features right open helicoidal drive surfaces 210a, 210b, it is understood that the present invention is not limited to this particular shape, and that other drive surface geometries, e.g. a skew open or skew closed helicoid, may be used in alternative embodiments.

The generally planar back wall 212 of the cavity need not be continuous, and may for example be provided with a circular opening 214 centered on the axis $L_{cm}$, so as to facilitate accommodation of the axially protruding nose 110 on the coupling head 100. Portions of the back wall 212 that extend between the feet of trailing second and leading first drive surfaces 210a, 210b may then provide for stop surfaces against which the coupling head 100 may abut when it is axially inserted into the cavity 204 so as to prevent further relative axial travel. Where the back wall 212 adjoins the side wall 206, i.e. where the back wall 212 adjoins the generally cylindrical sections 208 of the side wall and/or the drive surfaces 210a, 210b protruding therefrom, concavely radiused ramp surfaces 216 may be provided to facilitate smooth contact between the coupling head 100 and the surfaces 208, 210a, 210b, 212 bounding the cavity 204.

A back of the coupling member 200 may be provided with a plurality of circularly aligned and equidistantly spaced apart, merlon-like protrusions 218. The protrusions 218 on the back of the coupling member may matingly correspond to recesses provided in a brush core 18a (FIG. 1), such that the coupling member 200 may be attached thereto, for example through an interference fit. Once the coupling member 200 is attached to the brush core 18a, the protrusions 218 enable the transfer of torque from the coupling member 200 to the brush core, so as to allow the latter to be driven in rotation.

Now that the construction of the exemplary embodiment of the drive coupling 50 has been described with reference to in particular FIGS. 3 and 4, attention is invited to its operation.

When their axes $L_{ch}$, $L_{cm}$ are aligned such that the positive direction associated with one axis points in the negative direction associated with the other axis, the coupling head 100 and the coupling member 200 may be joined in the configuration shown in FIG. 2. In this coupled condition, the generally triangular drive section 104 of the coupling head 100 is received in the cavity 204 of the coupling member 200. If, during axial joining, the drive section 104 of the coupling head 100 interferes with the drive cams 210 that protrude into the cavity 204, the helicoidal shape of the drive surfaces 210a, 210b of the drive cams 210 will provide guidance and naturally resolve the interference by commanding a rotating or helical motion of at least one of the coupling parts 100, 200.

If in the coupled condition of the coupling head 100 and the coupling member 200 a torque is applied to the coupling head 100, its drive surfaces 106 will rotate into contact with respective helicoidal drive surfaces 210a or 210b of the coupling member 200 in three locations (i.e. one contact location per pair of contacting drive surfaces), so as to form a three-point-coupling. The three-point-coupling eliminates the three degrees of freedom that characterize the drive coupling assembly configuration. Continued application of the torque will generate contact forces at each of the three locations of contact. The contact forces will transfer the torque applied to the coupling head 100 to the coupling member 200. In doing so, the axial components of the contact forces will tend to force the coupling head 100 and the coupling member 200 apart. Accordingly, axial play in the coupling will be eliminated as the drive section 104 of the coupling head is forced up the slope defined by the helicoidal drive surfaces 210a, 210b. Furthermore, the radial components of the contact forces will tend to center the coupling head 100 within the cavity 204 of the coupling member 200.

For the depicted embodiment of the drive coupling 50 featuring helicoidal first and second drive surfaces 210a, 210b, the relation between the torque applied to the coupling head 100 and the axial force that is consequently exerted on the coupling member 200 is specified by:

$$2\pi \cdot M = F \cdot p, \qquad (1)$$

wherein M [Nm] is the torque applied to the coupling head 100, F [N] is the axial force experienced by the coupling member 200, and p [m] is the pitch of the helicoid. To ensure sufficient axial force at relatively small torques, the pitch p may preferably be chosen such that $F \geq 35 \cdot M$, and more preferably be such that $F \geq 100 \cdot M$. The typical torque required to drive a brush may be on the order of about 0.2 Nm, and the minimum axial force required to reliably clasp a typical low-weight high-speed rotating brush (having a mass on the order of 50-100 grams) may be about 7 N, while optimal stability has been observed as off about 20 N; hence the presented relations.

The contact forces may thus provide for all of a tangentially directed force component that enables the transfer of torque, an axially directed force component that serves to squeeze axial play out of the drive coupling 50, and a radially directed force component that tends to center the coupling head 100 with respect to the coupling member 200. In practice, it may be the magnitude of the torque required to drive a brush 18 connected to the coupling member 100 that dictates the magnitude of the tangential components of the contact forces; the magnitudes of the axial and radial force components may be considered mere derivatives thereof (since they scale with the magnitude of the normal force). The magnitude of the torque to be applied at a contact point between a drive surface 106 of the coupling head 100 and a drive surface 210a or 210b of the coupling member 200 is the product of the tangential component of the normal force acting at the contact point and the associated lever arm, i.e. the radial distance from the contact point to the central rotation axis $L_{cm}$. Thus, if a constant torque is to be transferred, an increase in the lever arm must be compensated for by a decrease in the magnitude of the tangential component of the normal force, and vice versa. However, a decrease in the magnitude of the tangential component may lead to corresponding decreases in the axial and radial force components, which components may need to have minimum magnitudes to properly eliminate axial play and enable reliable centering of the coupling head 100 and the coupling member 200. Accordingly, the lever arm associated with the point of contact between the drive surfaces 106 of the drive head 100 and the drive surfaces 210a or 210b of the coupling member 200 may preferably have a maximum value. Calculations for the depicted embodiment of the drive coupling 50 have shown that the lever arm may have to be smaller than 15 mm, and preferably smaller than 9 mm, in order to ensure that small imbalances in a brush assembly (i.e. a brush including a drive coupling part) that may be expected to occur during the lifetime of the brush assembly, in particular as a result of wear, may still be compensated for by radial centering forces generated in the drive coupling at high rotational speeds of about 7,000 rpm. Accordingly, the drive surfaces 106, 210a, 210b of the coupling head 100 and the coupling member 200 may preferably have a radial extent equal to or smaller than 15 mm, and preferably equal to or smaller than 9 mm, with respect to their respective rotation axes $L_{ch}$, $L_{cm}$.

As soon as the application of torque to the coupling head ceases, the contact forces subside, that is, if at least one of the coupling head 100 and coupling member 200 is freely rotatably mounted around their common axis $L_{ch}$, $L_{cm}$. Accordingly, at rest, the coupling head 100 and the member 200 do not exert any significant radial or axial forces on each other that might cause long-term creep effects and induce imbalances.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

LIST OF ELEMENTS 1 hard floor cleaning device
2 power cord
4 handle
6 connection rod
8 housing
10 splashboard
12 waste reservoir
14 motor mechanism
16 transmission
18 brush
18a brush core
18b brush material
20 water reservoir
50 drive coupling assembly
100 coupling head
102 coupling head body
104 drive section
106 drive surface
108 connecting surface
110 nose
200 coupling member
202 coupling member body
204 coupling head reception cavity
206 side wall
208 generally cylindrical section of side wall
210 drive cam
210a,b leading first (a) and trailing second (b) drive surface
212 back wall
214 central opening in/passage through back wall
216 concavely radiused ramp
218 attachment protrusions
$L_{ch}$ rotation axis of coupling head
$L_{cm}$ rotation axis of coupling member
P radial-axial plane of symmetry through drive cam
R radius of curvature
T isosceles triangle for sweeping out first and second drive surfaces
$T_v$ vertex of isosceles triangle confined to motion on axis $L_{cm}$
$T_b$ base of isosceles triangle
r, t indication of radial and tangential directions in FIG. 4

The invention claimed is:

1. A drive coupling assembly for a high-speed rotating brush, comprising:
a coupling head having a coupling head rotation axis ($L_{ch}$) and including three drive surfaces, said three drive surfaces of the coupling head being arranged to be rotationally symmetrical through 120° with respect to said coupling head rotation axis ($L_{ch}$); and
a coupling member, having a coupling member rotation axis ($L_{cm}$) and including three first, right open helicoidal drive surfaces whose axis substantially coincides with the coupling member rotation axis ($L_{cm}$), said three drive surfaces of the coupling member being arranged to be rotationally symmetrical through 120° with respect to said coupling member rotation axis ($L_{cm}$),
wherein the coupling member further includes three second drive surfaces, each of said second drive surfaces being mirror symmetric to a respective said first right open helicoidal drive surface in a respective axial-radial plane of symmetry (P),
said coupling head and said coupling member being detachably couplable, such that, in a coupled state, their respective rotational axes ($L_{ch}$, $L_{cm}$) are aligned and the coupling head is rotatable to drive each of its three drive surfaces, said each drive surface of the coupling head being in contact with one of a respective first drive surface or said second drive surface of the coupling member, wherein the three drive surfaces of the coupling head and the three first and three second drive surfaces of the coupling member are configured such that rotatably driving the former in contact with the latter results in the exertion of both a torque and an axially directed force on the coupling member, which axially directed force is independent of whether the coupling member is driven clockwise or counter-clockwise with respect to its rotation axis ($L_{cm}$).

2. The drive coupling assembly according to 1, wherein each of the drive surfaces of the coupling head and each of the first and second drive surfaces of the coupling member have a radial extent ≤15 mm, wherein the radial extent is the length of the largest radius of the respective drive surface.

3. The drive coupling assembly according to 2, wherein the drive surfaces of the coupling head and the coupling member have a radial extent ≤9 mm.

4. The drive coupling assembly according to claim 1, wherein the coupling member defines a coupling head reception cavity, said cavity being bounded by a side wall that extends around the coupling member rotation axis ($L_{cm}$), said cavity providing for three radially inwardly protruding drive cams, each drive cam having a respective one of said first drive surfaces.

5. The drive coupling assembly according to claim 4, wherein each of said three radially inwardly protruding drive cams, viewed in a tangential direction with respect to the coupling member rotation axis ($L_{cm}$), provides for a leading first drive surface, and a trailing second drive surface.

6. The drive coupling assembly according to claim 4, wherein the coupling head reception cavity is further bounded by a generally planar back wall that extends perpendicular to the coupling member rotation axis ($L_{cm}$), and that connects to the side wall.

7. The drive coupling assembly according to claim 6, wherein the coupling head includes a generally triangular drive section that provides for the coupling head's drive surfaces, which are interconnected by connecting surfaces.

8. The drive coupling assembly according to claim 7, wherein each of the drive surfaces of the coupling head, seen in a plane perpendicular to the coupling head rotation axis ($L_{ch}$), includes a slight convex curvature.

9. The drive coupling assembly according to claim 8, wherein each of the drive surfaces of the coupling head, seen in a plane substantially transverse to a respective drive surface and containing the coupling head rotation axis ($L_{ch}$), has a convex curvature whose center of lies substantially on the coupling head rotation axis ($L_{ch}$).

10. The drive coupling assembly according to claim 7, wherein the back wall of the coupling head reception cavity includes a central opening or recess, and wherein the coupling head comprises a central nose that protrudes axially from the generally triangular drive section, said opening or recess being configured to receive the nose in the coupled condition of the coupling head and the coupling member.

11. A high-speed rotating brush assembly for a floor cleaning device, comprising an elongate, substantially cylindrical brush, extending between a first end and a second end, and configured to be rotatably mounted at said ends in a floor cleaning device, wherein one of said ends is provided with one of a coupling head or a coupling member of a drive coupling assembly,
    wherein said coupling head has a coupling head rotation axis ($L_{ch}$) and including three drive surfaces which are arranged to be rotationally symmetrical through 120° with respect to said coupling head rotation axis; and
    wherein said coupling member has a coupling member rotation axis ($L_{cm}$) and including three first, right open helicoidal drive surfaces whose axis substantially coincides with the coupling member rotation axis ($L_{cm}$), the three drive surfaces being arranged to be rotationally symmetrical through 120° with respect to said coupling member rotation axis,
    wherein said coupling member further includes three second drive surfaces, each of which second drive surfaces is mirror symmetric to a respective first drive surface in a respective axial-radial plane of symmetry (P), and in that
    said coupling head and said coupling member are detachably couplable, such that, in a coupled condition, their rotational axes ($L_{ch}$, $L_{cm}$) are aligned and the coupling head is rotatable to drive each of its drive surfaces in contact with a respective first or second drive surface of the coupling member,
    wherein the drive surfaces of the coupling head and the first and second drive surfaces of the coupling member are configured such that rotatably driving the former in contact with the latter results in the exertion of both a torque and an axially directed force on the coupling member, which axially directed force is independent of whether the coupling member is driven clockwise or counter-clockwise with respect to its rotation axis ($L_{cm}$).

12. A floor cleaning device, comprising:
an elongate, substantially cylindrical brush that is rotatably mounted around its longitudinal axis;
a motor mechanism configured to drive the brush into rotation at a rotational speed of at least 2500 rpm; and
a drive coupling assembly disposed in between the motor mechanism and the brush, such that, during operation, a torque generated by the motor mechanism is transferred onto said brush via said drive coupling assembly, together with a force directed along the longitudinal axis of the brush,
wherein the drive coupling assembly comprises:
a coupling head having a coupling head rotation axis ($L_{ch}$) and including three drive surfaces which are arranged to be rotationally symmetrical through 120° with respect to said coupling head rotation axis; and
a coupling member having a coupling member rotation axis ($L_{cm}$) and including three first, right open helicoidal drive surfaces whose axis substantially coincides with the coupling member rotation axis ($L_{cm}$), the three drive surfaces being arranged to be rotationally symmetrical through 120° with respect to said coupling member rotation axis,
wherein the coupling member further includes three second drive surfaces, each of which second drive surfaces is mirror symmetric to a respective first drive surface in a respective axial-radial plane of symmetry (P), and in that
said coupling head and said coupling member are detachably couplable, such that, in a coupled condition, their rotational axes ($L_{ch}$, $L_{cm}$) are aligned and the coupling head is rotatable to drive each of its drive surfaces in contact with a respective first or second drive surface of the coupling member, wherein the drive surfaces of the coupling head and the first and second drive surfaces of the coupling member are configured such that rotatably driving the former in contact with the latter results in the exertion of both a torque and an axially directed force on the coupling member, which axially directed force is independent of whether the coupling member is driven clockwise or counter-clockwise with respect to its rotation axis ($L_{cm}$).

* * * * *